(12) United States Patent
Golat et al.

(10) Patent No.: US 12,166,729 B2
(45) Date of Patent: Dec. 10, 2024

(54) LNA WITH TX HARMONIC FILTER

(71) Applicant: pSemi Corporation, San Diego, CA (US)

(72) Inventors: Joseph Golat, Crystal Lake, IL (US); David Kovac, Arlington Heights, IL (US)

(73) Assignee: pSemi Corporation, San Diego, CA (US)

( * ) Notice: Subject to any disclaimer, the term of this patent is extended or adjusted under 35 U.S.C. 154(b) by 392 days.

(21) Appl. No.: 17/675,331

(22) Filed: Feb. 18, 2022

(65) Prior Publication Data

US 2023/0269061 A1    Aug. 24, 2023

(51) Int. Cl.
*H04L 5/14* (2006.01)
*H04B 1/00* (2006.01)

(52) U.S. Cl.
CPC ......... *H04L 5/1461* (2013.01); *H04B 1/0064* (2013.01); *H04B 1/0067* (2013.01)

(58) Field of Classification Search
CPC ... H04L 5/1461; H04B 1/0064; H04B 1/0067; H04B 1/0057; H04B 1/006; H04B 1/1036; H04B 1/525
USPC .......................................................... 370/278
See application file for complete search history.

(56) References Cited

U.S. PATENT DOCUMENTS

| | | | |
|---|---|---|---|
| 8,502,283 B2 | 8/2013 | Xiang et al. | |
| 9,203,451 B2 | 12/2015 | Kehrer et al. | |
| 9,374,125 B1 | 6/2016 | Roberts | |
| 2013/0225101 A1* | 8/2013 | Basaran | H03H 7/0153 455/79 |
| 2015/0236798 A1 | 8/2015 | Nobbe | |
| 2016/0020793 A1 | 1/2016 | McCullagh | |
| 2016/0126990 A1 | 5/2016 | Leipold et al. | |
| 2016/0336915 A1* | 11/2016 | Kavousian | H03H 7/0123 |
| 2019/0181839 A1 | 6/2019 | Bauder et al. | |
| 2021/0013909 A1* | 1/2021 | Ono | H04B 1/40 |

OTHER PUBLICATIONS

International Search Report and Written Opinion issued for International PCT Application No. PCT/US2023/062316 filed on Feb. 9, 2023 on behalf of Psemi Corporation Mail Date: May 17, 2023. 11 pages.

* cited by examiner

*Primary Examiner* — Mang Hang Yeung
(74) *Attorney, Agent, or Firm* — Steinfl + Bruno, LLP

(57) ABSTRACT

Methods and devices for reducing coupling of RF frequency components between different bands of an RF system are presented. According to one aspect, a notch filter having a notch centered at a harmonic of a fundamental frequency of a first band transmit side is coupled to an output of an LNA of the first band. According to another aspect, the harmonic is a second harmonic, a third harmonic or higher order harmonics. According to another aspect, the notch filter includes a plurality of notches at respective plurality of harmonics. According to a further aspect, the notch has an attenuation of 30 dB or greater at the second harmonic and 10 dB or greater at the third harmonic. Further included is a method for reducing coupling of harmonics of signals transmitted in the first band into a receive path of the second band, thereby increasing noise figure/sensitivity performances of the receive path.

22 Claims, 11 Drawing Sheets

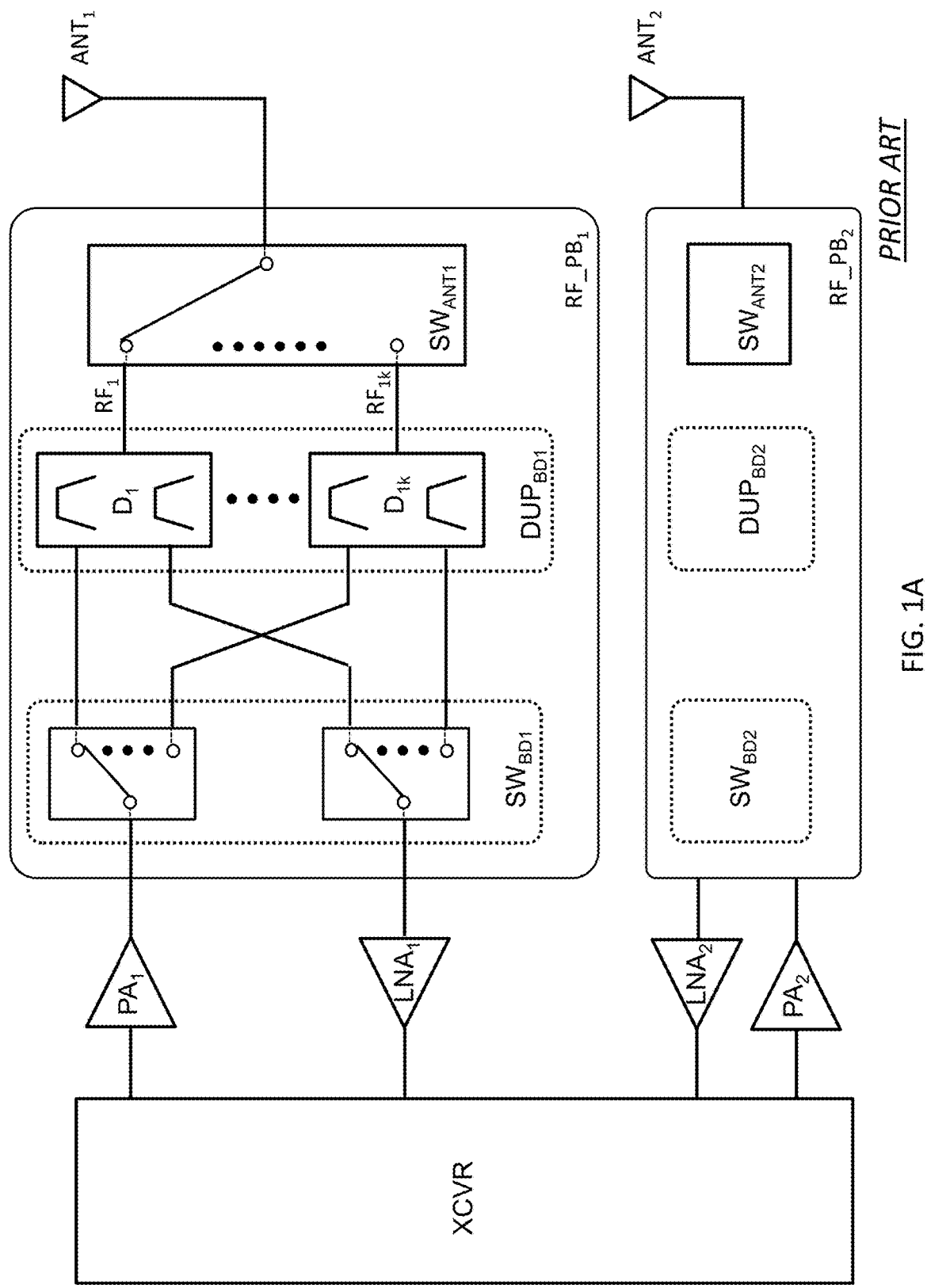
FIG. 1A *PRIOR ART*

| Band | Name | Mode | Downlink (MHz) Low | Downlink (MHz) Middle earfcn | Downlink (MHz) High | Bandwidth DL/UL (MHz) | Uplink (MHz) Low | Uplink (MHz) Middle earfcn | Uplink (MHz) High |
|---|---|---|---|---|---|---|---|---|---|
| 1 | 2100 | FDD | 2110 / 0 | 2140 / 300 | 2170 / 599 | 60 | 1920 / 18000 | 1950 / 18300 | 1980 / 18599 |
| 2 | 1900 PCS | FDD | 1930 / 600 | 1960 / 900 | 1990 / 1199 | 60 | 1850 / 18600 | 1880 / 18900 | 1910 / 19199 |
| 3 | 1800+ | FDD | 1805 / 1200 | 1842.5 / 1575 | 1880 / 1949 | 75 | 1710 / 19200 | 1747.5 / 19575 | 1785 / 19949 |
| 4 | AWS-1 | FDD | 2110 / 1950 | 2132.5 / 2175 | 2155 / 2399 | 45 | 1710 / 19950 | 1732.5 / 20175 | 1755 / 20399 |
| 5 | 850 | FDD | 869 / 2400 | 881.5 / 2525 | 894 / 2649 | 25 | 824 / 20400 | 836.5 / 20525 | 849 / 20649 |
| 7 | 2600 | FDD | 2620 / 2750 | 2655 / 3100 | 2690 / 3449 | 70 | 2500 / 20750 | 2535 / 21100 | 2570 / 21449 |
| 8 | 900 GSM | FDD | 925 / 3450 | 942.5 / 3625 | 960 / 3799 | 35 | 880 / 21450 | 897.5 / 21625 | 915 / 21799 |
| 9 | 1800 | FDD | 1844.9 / 3800 | 1862.5 / 3975 | 1879.9 / 4149 | 35 | 1749.9 / 21800 | 1767.5 / 21975 | 1784.9 / 22149 |
| 10 | AWS-1+ | FDD | 2110 / 4150 | 2140 / 4450 | 2170 / 4749 | 60 | 1710 / 22150 | 1740 / 22450 | 1770 / 22749 |

LNA WITH TX HARMONIC FILTER

TECHNICAL FIELD

The present disclosure is related to electronic radio frequency (RF) circuits, and more particularly to use of a notch filter to reduce coupling of RF frequency components of a transmit side of an RF frontend stage operating at a first frequency band onto a receive side of the RF frontend stage operating at a frequency band that is different from the first frequency band.

BACKGROUND

Radio frequency (RF) devices, such as cell phone transmitters, are becoming increasingly complex due to additional frequency bands, more complex modulation schemes, higher modulation bandwidths, and the introduction of data throughput improvement schemes such as simultaneous RF transmission and/or reception within a same or different, but closely spaced, bands or channels within a band (e.g., voice, data), as used in schemes such as carrier aggregation and dual connectivity.

Due to the higher complexity of transmit/receive paths (transmit and/or receive paths) of a frontend stage (e.g., 100 of FIG. 1A) used in such RF devices, which may include devices such as duplexers and/or diplexers (e.g., $DUP_{BD1}$, $DUP_{BD2}$, of FIG. 1A), switches (e.g., $SW_{BD1}$, $SW_{BD2}$, $SW_{ANT1}$, $SW_{ANT2}$ of FIG. 1A), etc., coupled between one or more antennae (e.g., $ANT_1$, $ANT_2$ of FIG. 1A) and amplifiers (e.g., transmit power amplifiers $PA_1$, $PA_2$, receive low noise amplifier $LNA_1$, $LNA_2$ of FIG. 1A), coupling of a frequency of a first band being processed by a transmit path onto a receive path that operates at a different frequency (e.g., second band) may be possible. Such coupling, which may include coupling of a fundamental (or center) frequency of the first band as well as its harmonics, may in turn degrade the performance of the receive path such as to desensitize the receive path during operation in the second band. Reducing such coupling is a motivation of the teachings according to the present disclosure.

SUMMARY

According to a first aspect of the present disclosure, a multi-band multi-channel radio frequency (RF) frontend circuit is presented, comprising: a first processing block for processing of a first RF signal in a frequency range of a first band, the first processing block comprising a first transmit power amplifier (PA) and a first receive low noise amplifier (LNA); a second processing block for processing of a second RF signal in a frequency range of a second band, the second processing block comprising a second receive LNA; and a notch filter coupled at an output of the first receive LNA, wherein the notch filter comprises a notch at a harmonic of a first frequency, the first frequency being included in the frequency range of the first band.

According to a second aspect of the present disclosure, a multi-band multi-channel radio frequency (RF) frontend circuit is presented, comprising: a first band that transmits through a first transmit power amplifier (PA) and receives through a first receive low noise amplifier (LNA); a second band that receives through a second receive LNA; and a notch filter coupled at an output of the first receive LNA, wherein the notch filter comprises a notch at a harmonic of a first frequency, the first frequency being included in a frequency range of the first band.

According to a third aspect of the present disclosure, a method for reducing harmonic coupling in a multi-band multi-channel radio frequency (RF) frontend circuit is presented, the method comprising: providing a first processing block for processing of a first RF signal in a frequency range of a first band, the first processing block comprising a first transmit power amplifier (PA) and a first receive low noise amplifier (LNA); providing a second processing block for processing of a second RF signal in a frequency range of a second band, the second processing block comprising a second receive LNA; coupling a notch filter at an output of the first receive LNA, the notch filter comprising a notch at a harmonic of a first frequency, the first frequency being included in the frequency range of the first band; and based on the coupling, reducing a level of the harmonic of the first frequency that is coupled to the second receive LNA.

Further aspects of the disclosure are provided in the description, drawings and claims of the present application.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 1A shows a simplified block diagram of a prior art multi-band and multi-channel RF frontend stage.

FIG. 2 shows a table representative of some frequency ranges of bands.

Like reference numbers and designations in the various drawings indicate like elements.

DETAILED DESCRIPTION

Figure 1B:
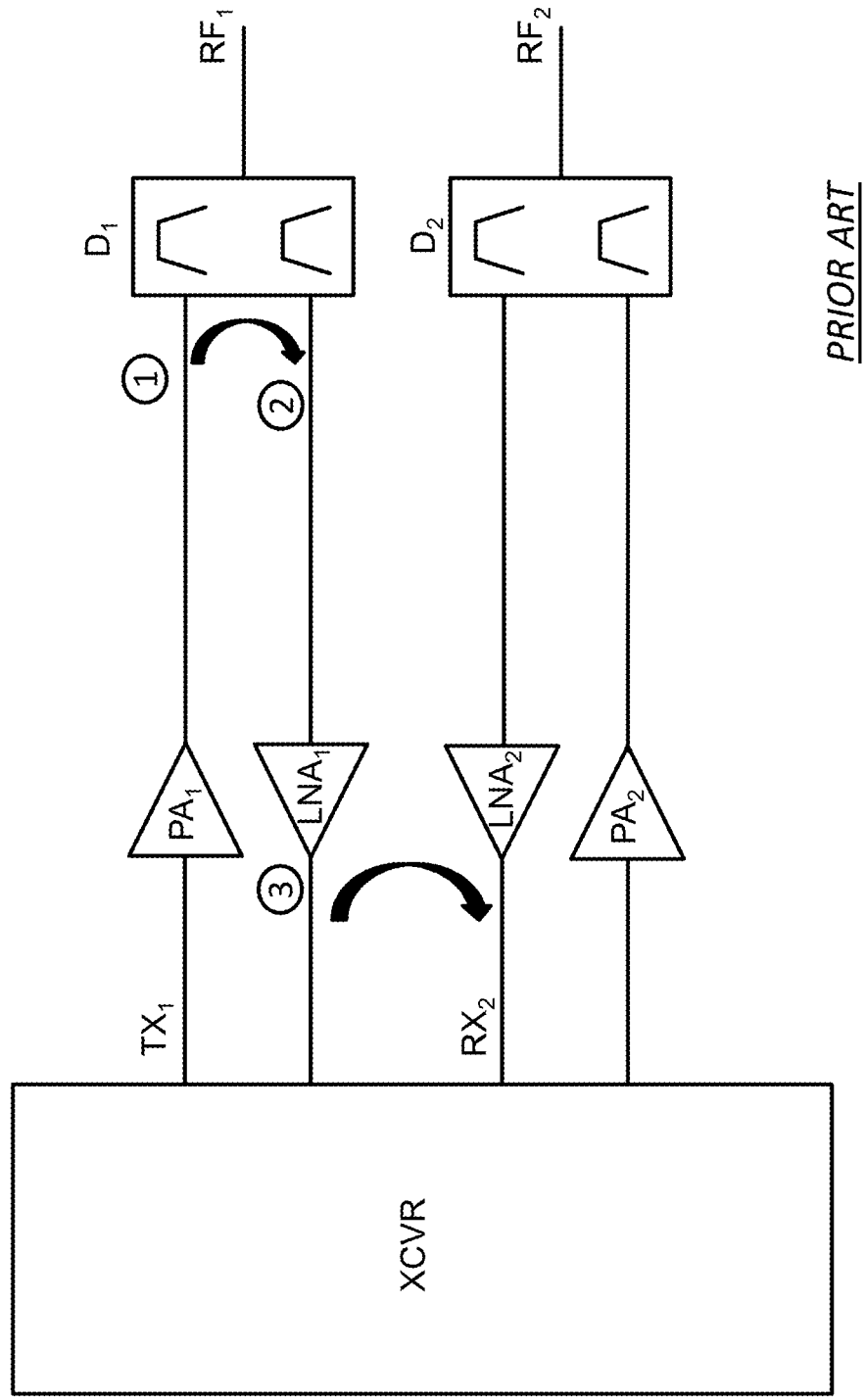
FIG. 1B shows the RF frontend stage of FIG. 1A configured for operation according to two different bands.

As used in the present disclosure, the term "mode" can refer to a wireless standard and its attendant modulation and coding scheme or schemes. As different modes may require different modulation schemes, these may affect required channel bandwidth as well as affect the peak-to-average-ratio (PAR), also referred to as peak-to-average-power-ratio (PAPR), as well as other parameters known to the skilled person. Examples of wireless standards include Global System for Mobile Communications (GSM), code division multiple access (CDMA), Worldwide Interoperability for Microwave Access (WiMAX), Long Term Evolution (LTE), as well as other wireless standards identifiable to a person skilled in the art. Examples of modulation and coding schemes include binary phase-shift keying (BPSK), quadrature phase-shift keying (QPSK), quadrature amplitude modulation (QAM), 8-QAM, 64-QAM, as well as other modulation and coding schemes identifiable to a person skilled in the art.

As used in the present disclosure, the terms "channel" and "band" are used interchangeably and can refer to a frequency range. More in particular, the terms "channel" and "band" as used herein refers to a frequency range that can be defined by a wireless standard such as, but not limited to, wideband code division multiple access (WCDMA) and long-term evolution (LTE). In some standards, each band may be subdivided into a plurality of channels.

FIG. 1A shows a simplified block diagram of a prior art (multi-band and multi-channel) RF frontend stage (100) which may simultaneously process two different (groups of) bands (e.g., referred to as BD1, BD2) via respective power amplifiers ($PA_1$, $PA_2$) and low noise amplifiers ($LNA_1$, $LNA_2$) coupled to a transceiver, XCVR. In particular, the amplifiers ($PA_1$, $LNA_1$) may transmit and/or receive RF signals of a first band (or group/plurality of bands) through a first antenna, $ANT_1$, coupled to a first RF processing block, $RF\_PB1_1$, and the amplifiers ($PA_2$, $LNA_2$) may transmit and/or receive RF signals of a second band (or group/plurality of bands) through a second antenna, $ANT_2$, coupled to a second RF processing block, $RF\_PB1_2$. It should be noted that in some known configurations, the amplifiers ($PA_1$, $LNA_1$) and the amplifiers ($PA_2$, $LNA_2$) may transmit and/or receive RF signals of the respective bands from a same antenna (e.g., $ANT_1$) through a diplexer (not shown in the figure).

As shown in FIG. 1A, each of the first and second RF processing blocks ($RF\_PB_1$, $RF\_PB_2$) may include respective antenna switches ($SW_{ANT1}$, $SW_{ANT2}$) that selectively couple the respective antennae ($ANT_1$, $ANT_2$) to a bank of filters ($DUP_{BD1}$, $DUP_{BD2}$) that may include, for example, one or more duplexers (e.g., $D_1, \ldots, D_{1k}$), for transmit and receive of one or more of different bands through a same antenna (e.g., $ANT_1$). In turn, the bank of filters ($DUP_{BD1}$, $DUP_{BD2}$) may be selectively coupled to a respective set of amplifiers ($PA_1$, $LNA_1$) and ($PA_2$, $LNA_2$) through respective band switches ($SW_{BD1}$, $SW_{BD2}$) for transmitting and/or receiving of an RF signal of a selected band. Each pair of amplifiers ($PA_1$, $LNA_1$) and ($PA_2$, $LNA_2$) may operate over a frequency range that is wider than frequency ranges of individual bands of a given wireless standard, therefore a plurality of such individual bands may be grouped for processing by each of the pairs of amplifiers.

It should be noted that the simplified block diagram of FIG. 1A may represent one exemplary simplistic architecture of a prior art multi-band and multi-channel RF frontend stage for simultaneous processing of two different bands or groups of bands (and associated channels), through two different antennae (e.g., $ANT_1$, $ANT_2$). A person skilled in the art would know of many different implementations/architectures of such multi-band and multi-channel RF frontend stage that may include a plurality of (pairs of) amplifiers (e.g., $PA_1$, $LNA_1$ and $PA_2$, $LNA_2$) for processing of different groups of bands (each group containing one or more bands) through associated (band specific) filters (e.g., duplexers) and through respective transmit/receive ports, the transmit/receive ports including one or more ports that may include one or more antennae. Teachings according to the present disclosure may apply to any such architecture.

With continued reference to FIG. 1A, for processing of a first band through the antenna, $ANT_1$, the antenna switch, $SW_{ANT1}$, may selectively couple the antenna, $ANT_1$, to a first band duplexer, $D_1$, of the bank of filters, $DUP_{BD1}$, and the band switch, $SW_{BD1}$, may selectively couple the first band duplexer, $D_1$, to the associated pair of amplifiers ($PA_1$, $LNA_1$). In other words, for processing of the first band, or any of the supported bands, through the antenna, $ANT_1$, the antenna switch, $SW_{ANT1}$, and the band switch, $SW_{BD1}$, may selectively couple the antenna, $ANT_1$, to the associated pair of amplifiers ($PA_1$, $LNA_1$) through a corresponding (band specific) duplexer (e.g., $D_1, \ldots, D_{1k}$). Likewise, for (simultaneous) processing of any of the supported bands, through the antenna, $ANT_2$, the antenna switch, $SW_{ANT2}$, and the band switch, $SW_{BD2}$, may selectively couple the antenna, $ANT_2$, to the associated pair of amplifiers ($PA_2$, $LNA_2$) through a corresponding (band specific) duplexer (e.g., part of $DUP_{BD2}$).

FIG. 1B shows a simplified schematic of the RF frontend stage (100) of FIG. 1A configured for (simultaneous) operation according to two different bands. In particular, for the sake of simplicity, FIG. 1B only shows main circuit elements/devices used in the processing of each of the bands, including the (band specific) duplexers $D_1$ and $D_2$ respectively coupled to associated pairs of amplifiers ($PA_1$, $LNA_1$) and ($PA_2$, $LNA_2$). Furthermore, the RF frontend stage is shown in FIG. 1B as transmitting an RF signal, $RF_1$, of a first band (e.g., BD1) that is generated by the transceiver, XCVR, (e.g., as $TX_1$), amplified by the power amplifier, $PA_1$, and filtered by the duplexer, $D_1$. Also shown is FIG. 1B is an RF signal, $RF_2$, of a second band (e.g., BD2) that is filtered by the duplexer, $D_2$, amplified by the low noise amplifier, $LNA_2$, and received by the transceiver, XCVR, (e.g., as $RX_2$).

As shown in FIG. 1B, an RF transmit path used in processing of the first band for generation of the RF signal, $RF_1$, may couple to an associated first band receive path (e.g., including the $LNA_1$) through the duplexer, $D_1$. For example, a portion of an RF signal at a location identified as 1 in FIG. 1B may couple through the duplexer, $D_1$, to a location identified as 2 in FIG. 1B. In turn the coupled signal at the location 2 may get amplified by the associated first band receive amplifier, $LNA_1$. It should be noted that although the duplexer $D_1$ may be designed with care and according to best practices to provide an industry accepted level of isolation between its receive and transmit paths/sections (e.g., filters), due to a combination of a high power level of the transmit RF signal (e.g., $RF_1$) and the high gain of the receive path through $LNA_1$ a small level of a coupled RF signal at the location 2 may be sufficiently amplified by the $LNA_1$ to couple, at a location 3, to the receive path used in processing of the second band. As shown in FIG. 1B, the location 3 may be at the receive side of the second band receive path between an output of the amplifier, $LNA_2$, and the transceiver, XCVR. Such coupling between first and second band receive paths may be through corresponding trances and/or transceiver pins.

With continued reference to FIG. 1B, it should be noted that center/fundamental frequencies of the two bands may be sufficiently distanced such as a coupling of the fundamental frequency of the first band (transmit side) to the second band may not affect performance (e.g., receive side sensitivity, noise figure) of the second band. However, in cases where harmonics of the fundamental frequency of the first band (transmit side) fall into a range of frequencies of the second band, the coupling from the location 3 to the receive side of the second band as shown in FIG. 1B, may negatively affect performance (e.g., receive side sensitivity, noise figure) of the second band. Such harmonics may be generated, for example, by nonlinearities in a frequency response of any one of the amplifiers $PA_1$ or $LNA_1$. Teachings according to the present disclosure reduce the coupling of the harmonics of the fundamental frequency of the first band to the receive side of the second band, thereby effectively increasing performance of the second band.

FIG. 2 shows a table representative of some frequency ranges of bands according to an exemplary wireless standard (e.g., LTE) that may be supported by an RF frontend stage (e.g., 100 of FIG. 1A-1B). The table includes values for a supported band and corresponding name (e.g., Band, Name), mode of operation (e.g., FDD for frequency division duplex), as well as frequency ranges (e.g., Low, Middle, High) for each of the receive (e.g., Downlink) and transmit (e.g., Uplink) sides of the band and corresponding bandwidth (e.g., Bandwidth). Highlighted in the table of FIG. 2 are exemplary frequency ranges (e.g., 1805-1880 MHZ) and (880-915 MHZ) respectively corresponding to the receive side of the Band 3 and the transmit side of the Band 8. In particular, a person of ordinary skills may clearly realize that a center/fundamental frequency (e.g., 910 MHZ) of the transmit side of the Band 8 includes harmonics (e.g., second harmonic) that fall within the frequency range (e.g., 1805-1880 MHZ) of the receive side of Band 8.

Considering the configuration described above with reference to FIG. 1B, wherein the first band processed/transmitted is the Band 8 of the table shown in FIG. 2, and the second band processed/received is the Band 3 of the table. In such configuration, an RF coupling from the location 3 of the receive side of the first band to the receive side of the second band as shown in FIG. 1B, may include higher order harmonics, including a second order harmonic (e.g., 1820 MHz), of the fundamental frequency of the first band (e.g., transmit side, 910 MHZ). Accordingly, such harmonics may fall into a frequency range of the receive side of the second band (e.g., 1805-1880 MHZ) to affect its performance (e.g., receive side sensitivity, noise figure).

Figure 3:
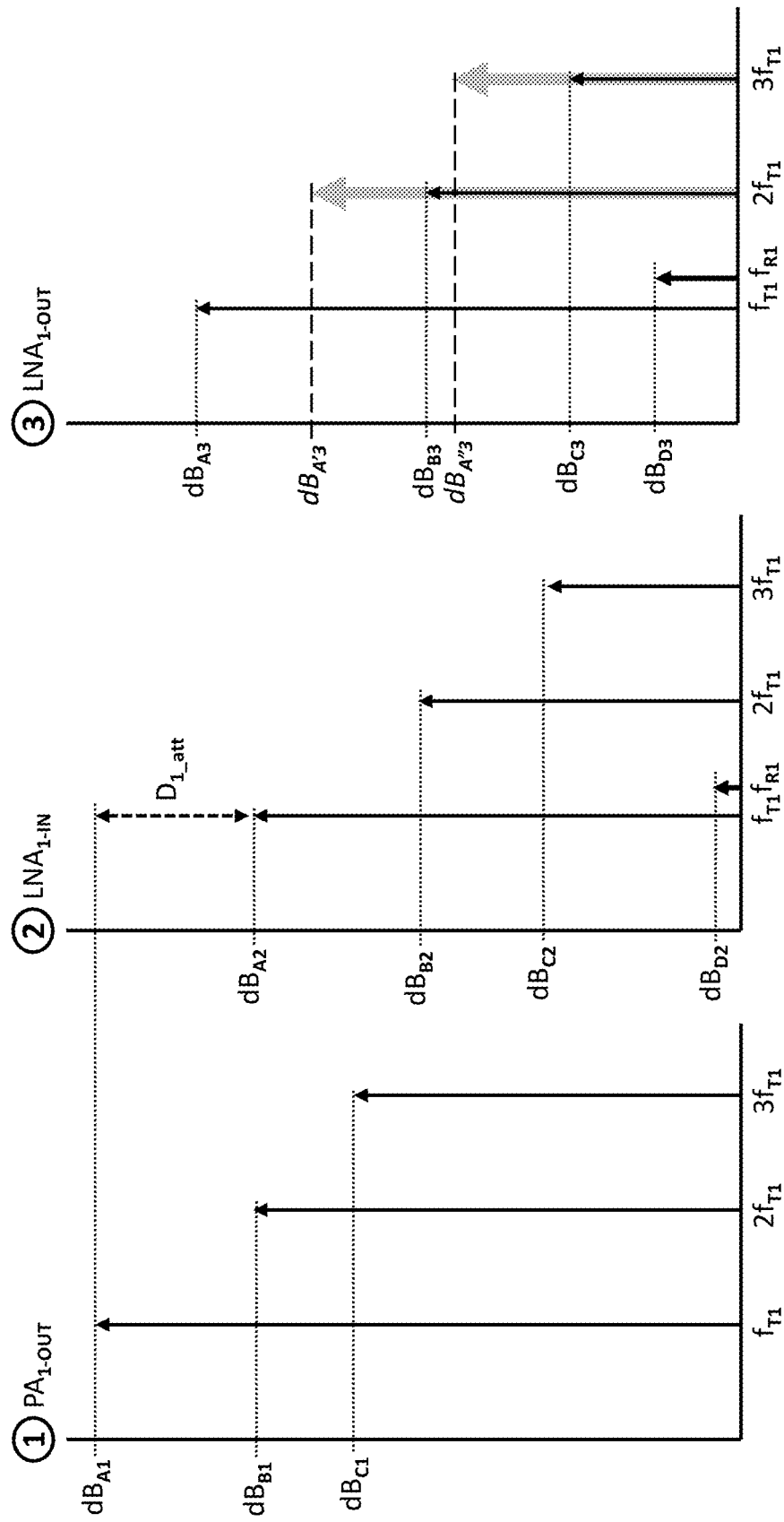
FIG. 3 shows graphs representative of power levels of a transmit RF signal coupled to the RF frontend stage of FIG. 1B.

FIG. 3 shows graphs representative of power levels of a transmit RF signal coupled to the locations 1, 2 and 3 of the RF frontend stage (100) of FIG. 1B while configured for simultaneous operation (e.g., transmission and/or reception) according to the Band 8 and Band 3 of the table shown in FIG. 2. In particular, the graph on the left side of FIG. 3, labelled as 1, shows exemplary RF power levels $dB_{A1}$, $dB_{B1}$, and $dB_{C1}$ respectively corresponding to the fundamental/center frequency, $f_{T1}$, of the transmit band (e.g., Band 8), and the second, $2f_{T1}$, and third, $3f_{T1}$, harmonics, at the location 1 of FIG. 1B, or in other words, at the output of the amplifier, $PA_1$, and input of the duplexer, $D_1$. As noted above, the second and third harmonics may be generated by, for example, nonlinearities in a response of the amplifier, $PA_1$. The graph at the center of FIG. 3, labelled as 2, shows exemplary RF power levels $dB_{A2}$, $dB_{B2}$, and $dB_{C2}$ respectively corresponding to the fundamental/center frequency, $f_{T1}$, of the transmit band (e.g., Band 8), and the second, $2f_{T1}$, and third, $3f_{T1}$, harmonics, at the location 2 of FIG. 1B, or in other words, at the input of the amplifier, $LNA_1$. As described above, the RF power levels ($dB_{A2}$, $dB_{B2}$, $dB_{C2}$) may represent a portion of the RF signal processed in the transmit side of the first band (e.g., Band 8) that is coupled to the receive side of the first band through the duplexer, $D_1$ (e.g., with a corresponding power level attenuation amount of $D_{1\_att}$ at the frequency $f_{T1}$). Furthermore, shown in the center graph of FIG. 3 is an exemplary RF power level, $dB_{D2}$, corresponding to a fundamental frequency, $f_{R1}$, of an RF signal received (or expected to be received) through the receive side of the first band (e.g., signal $RF_1$ of FIG. 1B for processing by $D_1$ and $LNA_1$). As shown in FIG. 3, the RF power level, $dB_{D2}$, may be much lower when compared to the power level, $dB_{A2}$, and at a frequency, $f_{R1}$, (e.g., in a range from 925-960 MHz of receive side of the Band 8) that is closely spaced to the frequency, $f_{T1}$, (e.g., in a range from 880-915 MHZ of transmit side of the Band 8).

With continued reference to FIG. 3, the graph at the right side of FIG. 3, labelled as 3, shows exemplary RF power levels $dB_{A3}$, $dB_{B3}$, and $dB_{C3}$ respectively corresponding to the fundamental/center frequency, $f_{T1}$, of the transmit band (e.g., Band 8), and the second, $2f_{T1}$, and third, $3f_{T1}$, harmonics, at the location 3 of FIG. 1B, or in other words, at the output of the amplifier, $LNA_1$. In other words, the RF power levels ($dB_{A3}$, $dB_{B3}$, $dB_{C3}$) may represent the RF power levels ($dB_{A2}$, $dB_{B2}$, $dB_{C2}$) after amplification by the amplifier, $LNA_1$. For example, due to the relative proximity of the frequencies, $f_{T1}$ and $f_{R1}$, the amplifier, $LNA_1$, that may be tuned for operation about the frequency, $f_{R1}$, may amplify the coupled RF at the frequency, $f_{T1}$ (e.g., $dB_{A3}$ greater than $dB_{A2}$), but not amplify (e.g., attenuate, reduce) the coupled RF at the (harmonics) frequencies, $2f_{T1}$ and $3f_{T1}$ (e.g., $dB_{B3}$ and $dB_{C3}$ equal to, or smaller than, $dB_{B2}$ and $dB_{C2}$ respectively). Furthermore, shown in the graph at the right side of FIG. 3 is an exemplary RF power level, $dB_{D3}$, corresponding to an amplified version (e.g., through the amplifier, $LNA_1$) of the power level $dB_{D2}$, at the fundamental frequency, $f_{R1}$, of the RF signal received.

As shown in FIG. 3, Applicant of the present disclosure has established that due to the relatively high RF power level (e.g., $dB_{A2}$) of the coupled transmit side RF signal at the fundamental/center frequency, $f_{T1}$, to the receive side (e.g., at location 2 of FIG. 1B), and the relative proximity of the frequencies, $f_{T1}$ and $f_{R1}$, nonlinearities in a response of the amplifier, $LNA_1$, may generate (higher order) harmonics of the fundamental/center frequency, $f_{T1}$, to the receive side. These are shown in the graph at the right side of FIG. 3 as RF components at the harmonic frequencies, $2f_{T1}$ and $3f_{T1}$, with respective power levels of $dB_{A'3}$ and $dB_{A''3}$. As shown in FIG. 3, the RF power levels, $dB_{A'3}$ and $dB_{A''3}$, may be greater than the RF power levels, $dB_{B3}$ and $dB_{C3}$, at the corresponding harmonic frequencies, $2f_{T1}$ and $3f_{T1}$. Although the RF frontend stage (e.g., 100 of FIG. 1A-1B) may be designed to achieve a given receive side performance (e.g., sensitivity, noise figure) of the second band in spite of (expected) coupling of the RF power levels, $dB_{B3}$ and $dB_{C3}$, from the transmit side of the first band (e.g., at location 3 of FIG. 1B), it may not achieve an acceptable performance for greater coupled RF power levels, such as the RF power levels $dB_{A'3}$ and $dB_{A''3}$, generated by nonlinearities of the amplifier, $LNA_1$, responsive to the coupled RF component/signal (e.g., $dB_{A2}$) at the fundamental/center frequency, $f_{T1}$. In other words, self-generated (e.g., via $LNA_1$) RF components (e.g., at $2f_{T1}$, $3f_{T1}$, etc.) of the receive side of the first band may couple to the receive side of the second band (e.g., through coupling at location 3 of FIG. 1B) and affect performance.

Figure 4A:
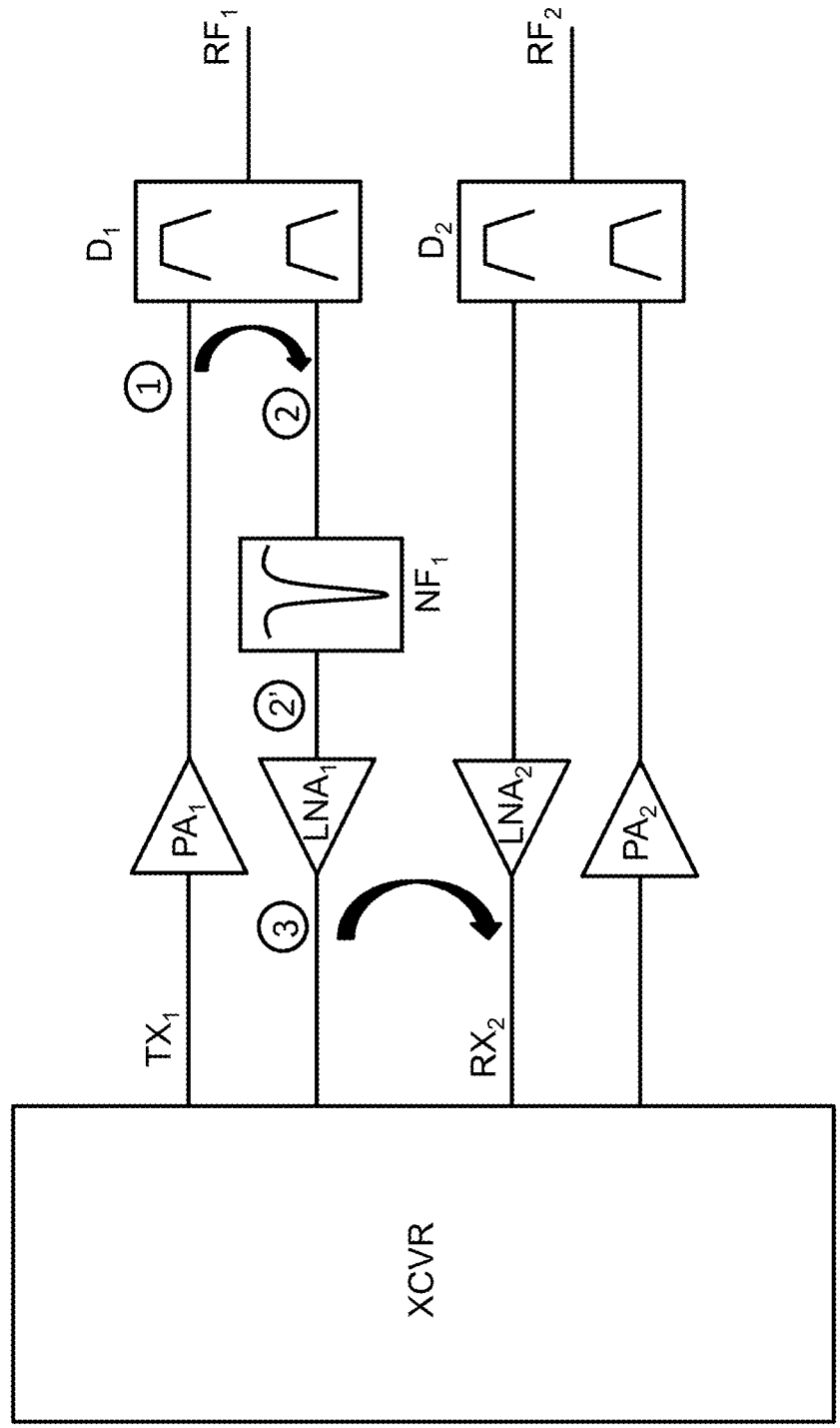
FIG. 4A shows the RF fronted stage of FIG. 1B modified to include a notch filter.
Figure 4B:
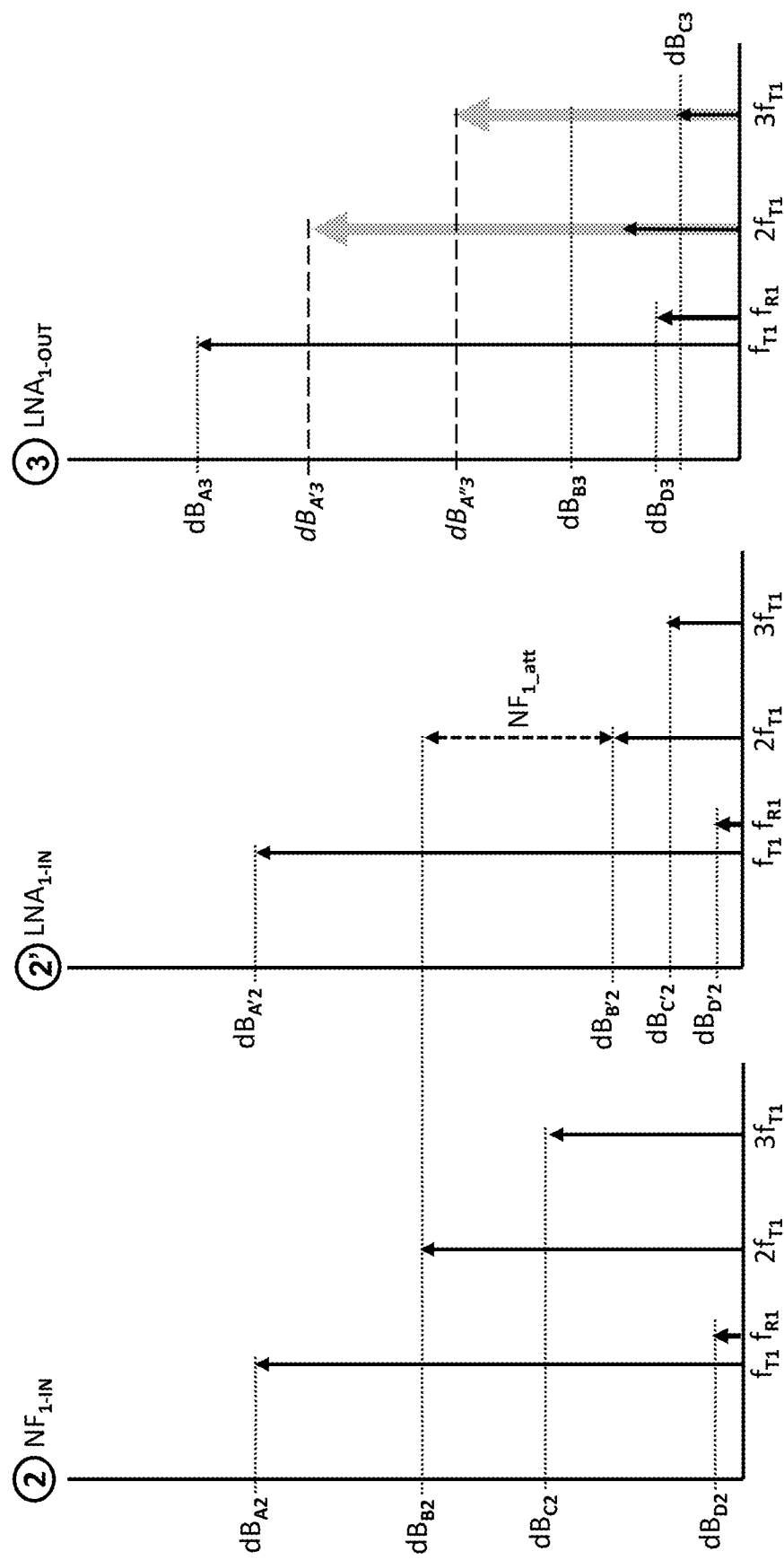
FIG. 4B shows graphs representative of power levels of a transmit RF signal coupled to the RF frontend stage of FIG. 4A.

FIG. 4A shows the RF fronted stage of FIG. 1B modified to include a notch filter, $NF_1$, arranged at an input of the amplifier, $LNA_1$, and FIG. 4B shows graphs representative of power levels of the transmit RF signal of the first band coupled to locations 2, 2' and 3 shown in the RF frontend stage (400) of FIG. 4A. In particular, the graph at the left side of FIG. 4B shows the RF power levels ($dB_{A2}$, $dB_{B2}$, $dB_{C2}$, $dB_{D2}$) described above with reference to FIG. 3. The graph at the center of FIG. 3 shows corresponding RF power levels ($dB_{A'2}$, $dB_{B'2}$, $dB_{C''2}$, $dB_{D'2}$) at the location 2' of FIG. 4A which corresponds to a location after the notch filter, $NF_1$, and therefore represents power levels as presented to the input of the amplifier, $LNA_1$.

As shown in the center graph of FIG. 4B, the notch filter, $NF_1$, may include notches (e.g., band-reject filter with a narrow reject band or band-stop filter with a narrow stopband) at one or more of the harmonics (e.g., $2f_{T1}$, $3f_{T1}$, etc.) such as to substantially attenuate the corresponding RF power levels (e.g., $dB_{B'2}$, $dB_{C'2}$) but may not attenuate the RF power level (e.g., $dB_{A'2}$) at the fundamental/center frequency (e.g., $f_{T1}$) of the transmit side of the first band. In other words, because of the relative short (frequency) distance between the fundamental/center frequency, $f_{T1}$, of the transmit side of the first band and the fundamental/center frequency, $f_{R1}$, of the receive side of the first band, implementation of a filter having a notch that is narrow enough to encompass/affect the frequency, $f_{T1}$, without affecting the frequency, $f_{R1}$, may not be feasible.

Accordingly, the notch filter, $NF_1$, may (effectively) not affect a level of the RF power at the frequency, $f_{T1}$. Therefore, as shown in FIG. 4B, the RF power level, $dB_{A'2}$, may be substantially same as the RF power level $dB_{A2}$. Accordingly, as shown in the graph at the right side of FIG. 4B, the RF power levels ($dB_{A'3}$, $dB_{A''3}$) generated at the harmonic frequencies ($2f_{T1}$, $3f_{T1}$) by nonlinearities of the LNA amplifier, $LNA_1$, as described above with reference to, for example, FIG. 3, may not be affected by the notch filter, $NF_1$. Teachings according to the present disclosure use a notch filter at the output of the LNA amplifier, $LNA_1$. This shown in FIG. 5A later described.

Figure 4C:
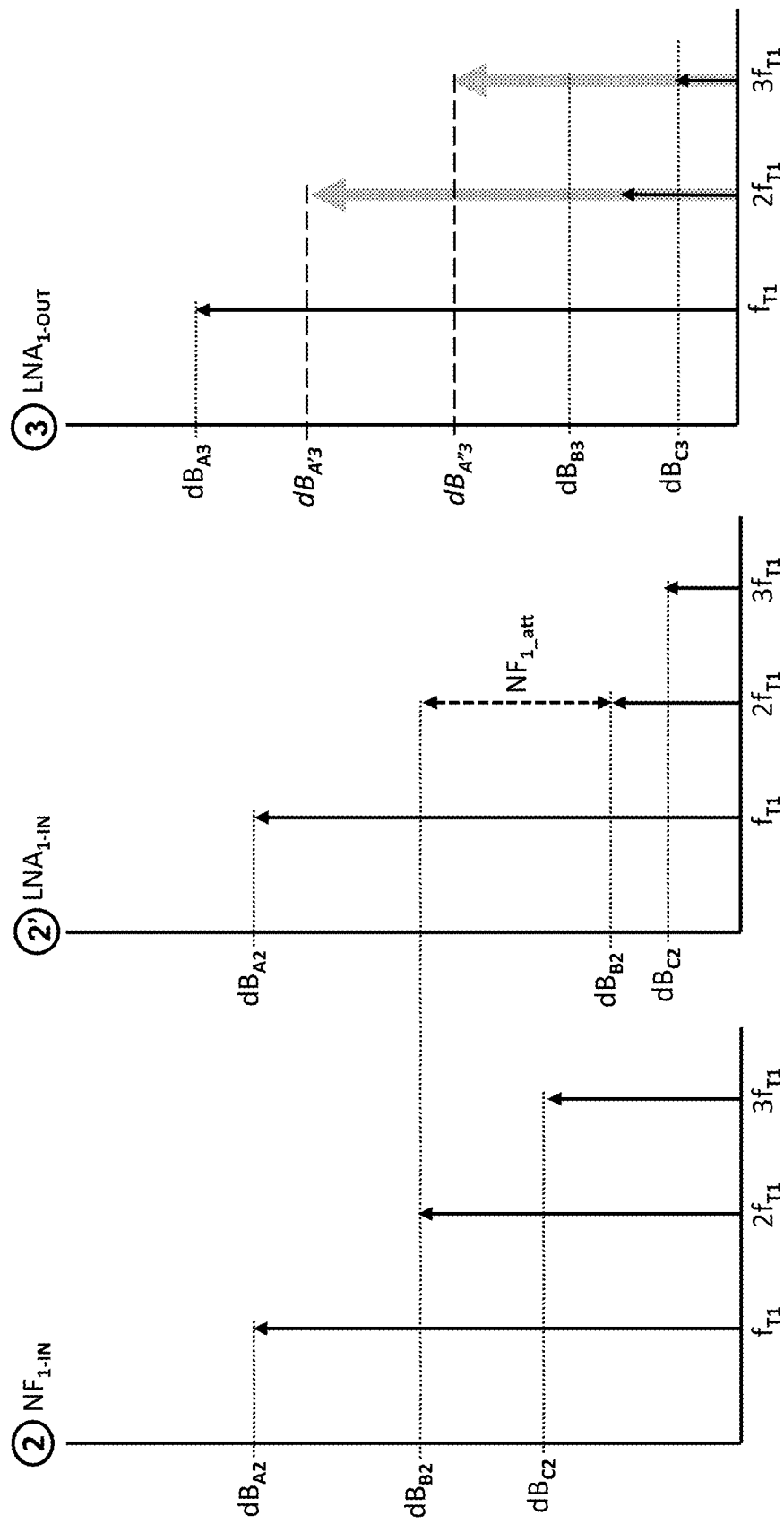
FIG. 4C shows graphs representative of power levels of a transmit RF signal coupled to the RF frontend stage of FIG. 4A in the absence of a receive RF signal.

Furthermore, because the RF power levels (e.g., $dB_{A'3}$, $dB_{A''3}$ of FIG. 4B) are solely based on the coupled RF signal/component at the fundamental/center frequency, $f_{T1}$, of the transmit side of the first band and nonlinearities of the LNA amplifier, $LNA_1$, their presence may not be affected by, or based on, a receive side RF signal of the first band. In other words, as shown in FIG. 4C, even in the absence of an RF signal (e.g., $dB_{D3}$ of FIG. 4B) at the fundamental/center frequency, $f_{R1}$, of the receive side of the first band, the same RF power levels ($dB_{A'3}$, $dB_{A''3}$) exist so long that the transmit side is processing an RF signal. It should be noted that an RF signal transmitted through the first band (e.g., Band 8 of FIG. 2) may be transmitted according to one of a plurality of adjacent channel frequency bands encompassed in a frequency range of the first band. Accordingly, a person skilled in the art would clearly realize that reference to the fundamental/center frequency, $f_{T1}$, of the first band per the description made above may equally relate to a fundamental/center frequency, $f_{CH1}$, of any channel whose frequency range is encompassed/contained in the (frequency range of the) first band.

Figure 5A:
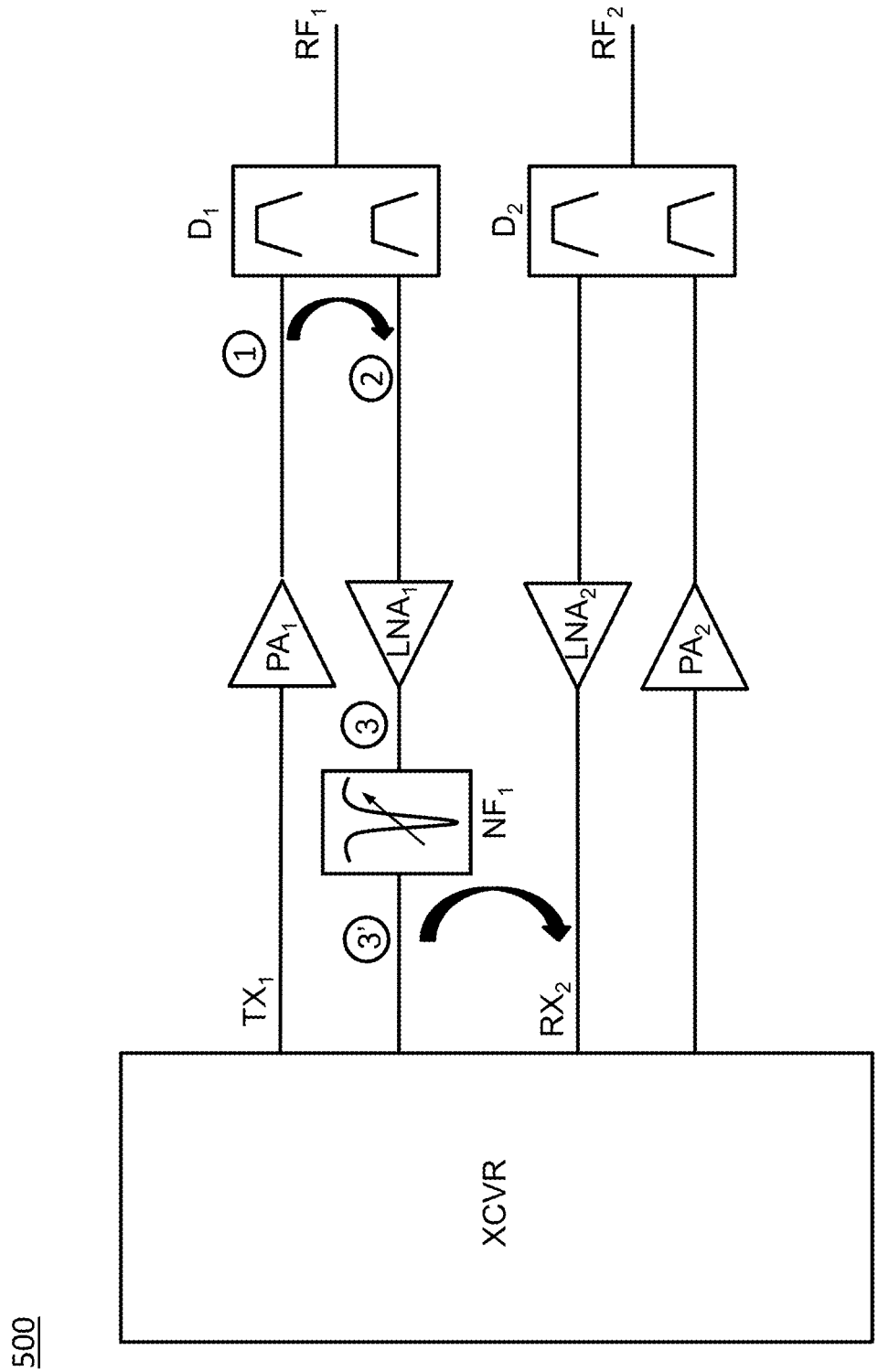
FIG. 5A shows the RF fronted stage of FIG. 1B modified according to an embodiment of the present disclosure to include a notch filter.
Figure 5B:
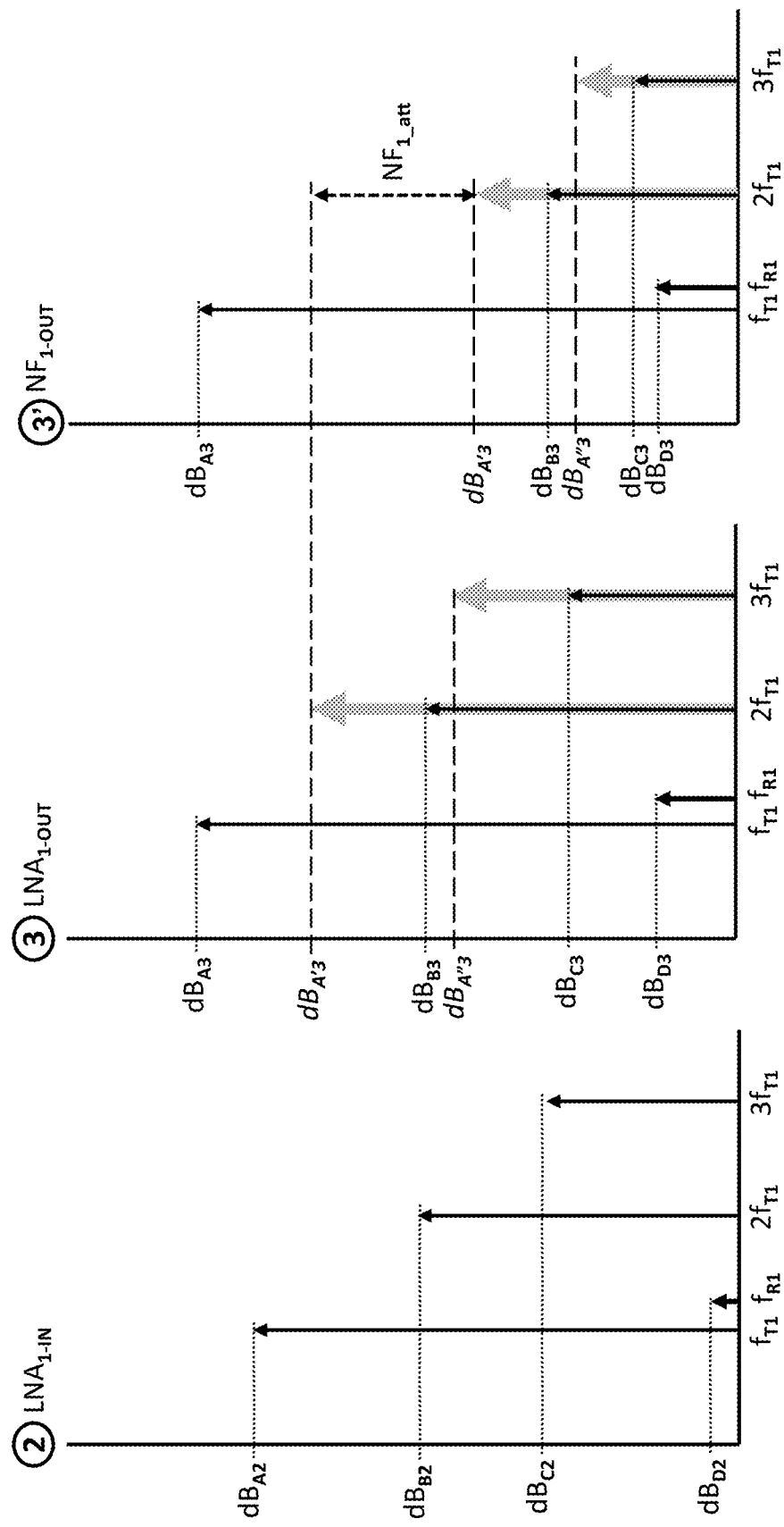
FIG. 5B shows graphs representative of power levels of a transmit RF signal coupled to the RF frontend stage of FIG. 5A.

FIG. 5A shows the RF fronted stage of FIG. 1B modified, according to an embodiment of the present disclosure, to include a notch filter, $NF_1$, arranged at an output of the amplifier, $LNA_1$, and FIG. 5B shows graphs representative of power levels of the transmit RF signal of the first band coupled to locations 2, 3 and 3' shown in the RF frontend stage (500) of FIG. 5A. In particular, the graph at the left side of FIG. 5B shows the RF power levels ($dB_{A2}$, $dB_{B2}$, $dB_{C2}$, $dB_{D2}$) and ($dB_{A3}$, $dB_{B3}$, $dB_{C3}$, $dB_{D3}$, $dB_{A'3}$, $dB_{A''3}$) described above with reference to FIG. 3 (e.g., with reference to locations 2 and 3 of FIG. 1B). Furthermore, the graph at the right side of FIG. 5B shows RF power levels ($dB_{A3}$, $dB_{D3}$) at the location 3' (of FIG. 5A) that remain (substantially) unchanged when processed through the notch filter, $NF_1$, and RF power levels ($dB_{B3}$, $dB_{C3}$, $dB_{A'3}$, $dB_{A''3}$) at the location 3' (of FIG. 5A) that are substantially reduced when processed through the notch filter, $NF_1$.

When used according to the present teachings, or in other words, when coupled at the output of the amplifier, $LNA_1$, as shown in FIG. 5A, the notch filter, $NF_1$, may substantially reduce the self-generated (e.g., via $LNA_1$) RF components (e.g., at $2f_{T1}$, $3f_{T1}$, etc.) of the receive side of the first band that may couple to the receive side of the second band (e.g., through coupling at location 3' of FIG. 5A) and affect performance. Accordingly, the notch filter, $NF_1$, may improve a performance (e.g., receive side sensitivity, noise figure) of the RF frontend stage (500) when compared to the RF frontend stages (100) and (400) of FIG. 1B and FIG. 4A respectively.

According to an exemplary nonlimiting embodiment of the present disclosure, the notch filter, $NF_1$, may include a first notch at about the frequency, $2f_{T1}$, to provide an attenuation (e.g., shown in FIG. 4B as $NF_{1\_att}$) of about 30 dB (e.g., 30 dB or greater) of the second harmonic component (e.g., $dB_{A'3}$ of FIG. 5B) at location 3' of FIG. 5A. According to another exemplary nonlimiting embodiment of the present disclosure, the notch filter, $NF_1$, may include a second notch at about the frequency, $3f_{T1}$, to provide an attenuation (not shown) of about 10 dB (e.g., 10 dB or greater) of the third harmonic component (e.g., $dB_{A''3}$ of FIG. 5B) at location 3' of FIG. 5A. It should be noted that design and realization of the notch filter, $NF_1$, is well known to a person skilled in the art, and therefore outside the scope of the present disclosure. In particular, any combination of one or more filters, or stages of filters, that may provide functionality of the notch filter, $NF_1$, as described in the present disclosure may be used. According to an embodiment of the present disclosure, and shown in FIG. 5A, the notch filter, $NF_1$, may be a tunable notch filter wherein the one or more frequencies of the one or more notches of the filter can be tuned, varied, selected, or changed. Such tuning of the location/frequencies of the notches may be in view of different values of the frequency $f_{T1}$, and/or different/specific targeted harmonics (e.g., any higher order).

Figure 6:
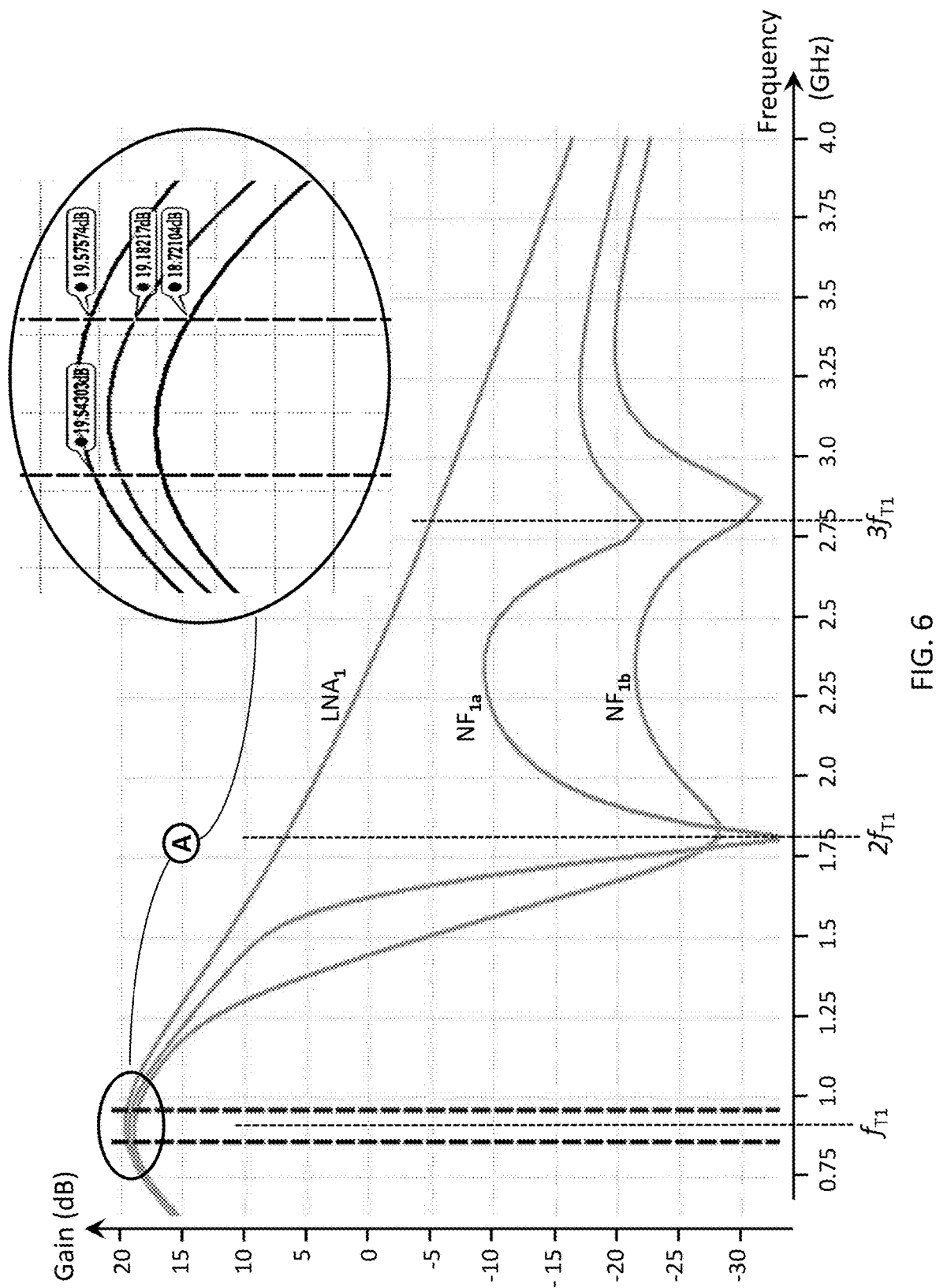
FIG. 6 shows graphs representative of different frequency responses of the RF frontend stage of FIG. 5A contrasted to a frequency response of the RF frontend stage of FIG. 1B.

Frequency responses (gain vs. frequency) for two exemplary notch filters, $NF_{1a}$ and $NF_{1b}$, coupled at the output of the amplifier, $LNA_1$, and of the amplifier, $LNA_1$, without filter, are shown in FIG. 6. As shown in FIG. 6, the notch filters $NF_{1a}$ and $NF_{1b}$, may have respective notches centered at about the second and third harmonic frequencies, $2f_{T1}$ and $3f_{T1}$, of the fundamental/center frequency, $f_{T1}$, of the transmit side first band (e.g., for an exemplary case where the first band and the second band operate respectively at the ranges of Band 8 and Band 3 of the LTE standard described above with reference to, for example, FIG. 2-3). On the other hand, the notch filters, $NF_{1a}$ and $NF_{1b}$, may include a passband (shown in FIG. 6 as a frequency range delimited by dotted lines and centered at about $f_{T1}$) that at the fundamental/center frequencies, $f_{T1}$ and $f_{T1}$, may provide an RF signal a loss/attenuation (e.g., in-band loss/attenuation) that is less than 1 dB, and therefore may pass the RF signal substantially unaltered. This is shown in the detail A of FIG. 6. It should be noted that in some filter implementations, a level of the (in-band) loss in the passband may be a tradeoff with a level of attenuation provided by the notches of the filters, $NF_{1a}$ and $NF_{1b}$. In other words, a greater notch/attenuation at one of the harmonics (e.g., $2f_{T1}$ and/or $3f_{T1}$) may be obtained at a cost of a greater in-band loss. Furthermore, it should be noted that center frequencies of the notches shown in FIG. 6 may not necessarily be at the exact harmonic frequencies of, $f_{T1}$, rather, those can be at the harmonic frequencies of, $f_{R1}$, or thereabouts. In other words, so long the attenuation provided by the notch at the harmonic frequencies of, $f_{T1}$, is sufficient to suppress ill effects of the corresponding coupled RF components to the receive side of the second band, exact center frequency of the notch may not be considered critical. According to some exemplary embodiments of the present disclosure, the center frequency of the notch may be distanced from the corresponding harmonic frequency of, $f_{T1}$, up to about half of the band bandwidth. For example, considering the Band 8 of FIG. 2 as the first band having a bandwidth, $BW_{B8}$, that is equal to 35 MHz as indicated in the table of FIG. 2, then the center frequency of the notch corresponding to the second harmonic frequency, $2f_{T1}$, may be in a frequency range from $2f_{T1}-0.5\times35$ MHz to $2f_{T1}+0.5\times35$ MHZ.

Figure 7:
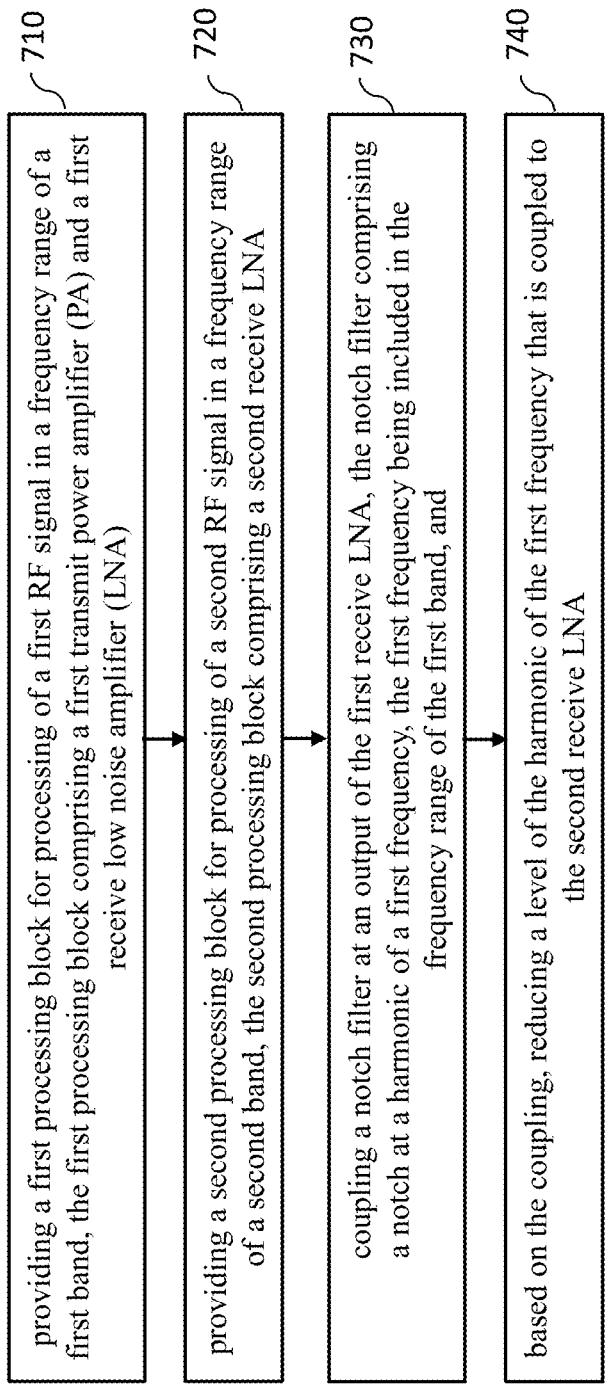
FIG. 7 is a process chart showing various steps of a method according to the present disclosure for reducing harmonic coupling in a multi-band multi-channel radio frequency (RF) frontend circuit.

FIG. 7 is a process chart (700) showing various steps of a method according to the present disclosure for reducing harmonic coupling in a multi-band multi-channel radio frequency (RF) frontend circuit. As shown in FIG. 7 such steps comprise: providing a first processing block for processing of a first RF signal in a frequency range of a first band, the first processing block comprising a first transmit power amplifier (PA) and a first receive low noise amplifier (LNA), per step (710); providing a second processing block for processing of a second RF signal in a frequency range of a second band, the second processing block comprising a second receive LNA, per step (720); coupling a notch filter at an output of the first receive LNA, the notch filter comprising a notch at a harmonic of a first frequency, the first frequency being included in the frequency range of the first band, per step (730); and based on the coupling, reducing a level of the harmonic of the first frequency that is coupled to the second receive LNA, per step (740).

The term "MOSFET", as used in this disclosure, includes any field effect transistor (FET) having an insulated gate whose voltage determines the conductivity of the transistor, and encompasses insulated gates having a metal or metal-like, insulator, and/or semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

As used in this disclosure, the term "radio frequency" (RF) refers to a rate of oscillation in the range of about 3 kHz to about 300 GHz. This term also includes the frequencies used in wireless communication systems. An RF frequency may be the frequency of an electromagnetic wave or of an alternating voltage or current in a circuit.

Various embodiments of the invention can be implemented to meet a wide variety of specifications. Unless otherwise noted above, selection of suitable component values is a matter of design choice. Various embodiments of the invention may be implemented in any suitable integrated circuit (IC) technology (including but not limited to MOSFET structures), or in hybrid or discrete circuit forms. Integrated circuit embodiments may be fabricated using any suitable substrates and processes, including but not limited to standard bulk silicon, high-resistivity bulk CMOS, silicon-on-insulator (SOI), and silicon-on-sapphire (SOS). Unless otherwise noted above, embodiments of the invention may be implemented in other transistor technologies such as bipolar, BiCMOS, LDMOS, BCD, GaAs HBT, GaN HEMT, GaAs pHEMT, and MESFET technologies. However, embodiments of the invention are particularly useful when fabricated using an SOI or SOS based process, or when fabricated with processes having similar characteristics. Fabrication in CMOS using SOI or SOS processes enables circuits with low power consumption, the ability to withstand high power signals during operation due to FET stacking, good linearity, and high frequency operation (i.e., radio frequencies up to and exceeding 300 GHz). Monolithic IC implementation is particularly useful since parasitic capacitances generally can be kept low (or at a minimum, kept uniform across all units, permitting them to be compensated) by careful design.

Voltage levels may be adjusted, and/or voltage and/or logic signal polarities reversed, depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functionality without significantly altering the functionality of the disclosed circuits.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form part of an end product such as a cellular telephone, laptop computer, or electronic tablet, or to form a higher-level module which may be used in a wide variety of products, such as vehicles, test equipment, medical devices, etc. Through various configurations of modules and assemblies, such ICs typically enable a mode of communication, often wireless communication.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, and/or parallel fashion.

It is to be understood that the foregoing description is intended to illustrate and not to limit the scope of the invention, which is defined by the scope of the following claims, and that other embodiments are within the scope of the claims. In particular, the scope of the invention includes any and all feasible combinations of one or more of the processes, machines, manufactures, or compositions of matter set forth in the claims below. (Note that the parenthetical labels for claim elements are for ease of referring to such elements, and do not in themselves indicate a particular required ordering or enumeration of elements; further, such labels may be reused in dependent claims as references to

The invention claimed is:

1. A multi-band multi-channel radio frequency (RF) frontend circuit, comprising:
   a first processing block for processing of a first RF signal in a frequency range of a first band, the first processing block comprising a first transmit power amplifier (PA) and a first receive low noise amplifier (LNA);
   a second processing block for processing of a second RF signal in a frequency range of a second band, the second processing block comprising a second receive LNA; and
   a notch filter coupled at an output of the first receive LNA, wherein the notch filter comprises a notch at a harmonic of a first frequency, the first frequency being included in the frequency range of the first band, and
   wherein the notch filter is configured to reduce a level of the harmonic of the first frequency that is coupled to the second receive LNA.

2. The multi-band multi-channel radio frequency (RF) frontend circuit of claim 1, wherein:
   the harmonic of the first frequency is included in the frequency range of the second band.

3. The multi-band multi-channel radio frequency (RF) frontend circuit of claim 1, wherein:
   the harmonic is a second harmonic of the first frequency.

4. The multi-band multi-channel radio frequency (RF) frontend circuit of claim 3, wherein:
   the notch provides an attenuation of 30 dB or greater at the harmonic of the first frequency.

5. The multi-band multi-channel radio frequency (RF) frontend circuit of claim 1, wherein:
   the harmonic is a third harmonic of the first frequency.

6. The multi-band multi-channel radio frequency (RF) frontend circuit of claim 5, wherein:
   the notch provides an attenuation of 10 dB or greater at the harmonic of the first frequency.

7. The multi-band multi-channel radio frequency (RF) frontend circuit of claim 1, wherein:
   the notch filter comprises additional one or more notches at corresponding one or more harmonics of the first frequency.

8. The multi-band multi-channel radio frequency (RF) frontend circuit of claim 1, wherein:
   the notch filter is a tunable notch filter configured to tune a center frequency of the notch.

9. The multi-band multi-channel radio frequency (RF) frontend circuit of claim 8, wherein:
   the first processing block is configured to process additional one or more bands having corresponding additional one or more frequency ranges, and
   the notch filter is configured to tune the center frequency of the notch to the harmonic of the first frequency or to a harmonic of a frequency that is included the additional one or more frequency ranges.

10. The multi-band multi-channel radio frequency (RF) frontend circuit of claim 1, wherein:
    the first processing block further comprises a duplexer coupled to an output of the first transmit PA and to an input of the first receive LNA.

11. The multi-band multi-channel radio frequency (RF) frontend circuit of claim 10, wherein:
    the duplexer is selectively coupled to the output of the first transmit PA and to the input of the first receive LNA via a switch.

12. The multi-band multi-channel radio frequency (RF) frontend circuit of claim 10, wherein:
    the duplexer is selectively coupled to a first antenna via a switch.

13. The multi-band multi-channel radio frequency (RF) frontend circuit of claim 12, wherein:
    the second receive LNA is selectively coupled to a second antenna.

14. The multi-band multi-channel radio frequency (RF) frontend circuit of claim 12, wherein:
    the second receive LNA is selectively coupled to the first antenna.

15. The multi-band multi-channel radio frequency (RF) frontend circuit of claim 14, wherein:
    the duplexer and the second receive LNA are coupled to the first antenna through a diplexer.

16. The multi-band multi-channel radio frequency (RF) frontend circuit of claim 1, wherein:
    the first band and the second band are bands defined by a wireless standard that includes wideband code division multiple access (WCDMA) or long-term evolution (LTE).

17. The multi-band multi-channel radio frequency (RF) frontend circuit of claim 1, wherein:
    the first transmit PA and the first and second receive LNAs comprise metal-oxide-semiconductor (MOS) field effect transistors (FETs), or complementary metal-oxide-semiconductor (CMOS) field effect transistors (FETs).

18. The multi-band multi-channel radio frequency (RF) frontend circuit of claim 17, wherein:
    said transistors are fabricated using one of: a) silicon-on-insulator (SOI) technology, and b) silicon-on-sapphire technology (SOS).

19. An electronic module comprising the multi-band multi-channel radio frequency (RF) frontend circuit of claim 1.

20. An electronic system, comprising:
    the electronic module of claim 19,
    wherein the electronic system includes any one of: a) a laptop computer, b) a cellular telephone, c) an electronic tablet, d) a vehicle, e) a test equipment, or f) a medical device.

21. A method for reducing harmonic coupling in a multi-band multi-channel radio frequency (RF) frontend circuit, the method comprising:
    providing a first processing block for processing of a first RF signal in a frequency range of a first band, the first processing block comprising a first transmit power amplifier (PA) and a first receive low noise amplifier (LNA);
    providing a second processing block for processing of a second RF signal in a frequency range of a second band, the second processing block comprising a second receive LNA;
    coupling a notch filter at an output of the first receive LNA, the notch filter comprising a notch at a harmonic of a first frequency, the first frequency being included in the frequency range of the first band; and
    based on the coupling, reducing a level of the harmonic of the first frequency that is coupled to the second receive LNA.

22. The method according to claim 21, wherein:
    the harmonic of the first frequency is included in the frequency range of the second band.

* * * * *